Oct. 7, 1952 — J. BROWN — 2,613,125

VELOCITY RECORDER

Filed Sept. 16, 1949

INVENTOR.
JOSEPH BROWN
BY
M. C. Hayes
ATTORNEY

Patented Oct. 7, 1952

2,613,125

UNITED STATES PATENT OFFICE 2,613,125

VELOCITY RECORDER

Joseph Brown, Philadelphia, Pa.

Application September 16, 1949, Serial No. 116,181

13 Claims. (Cl. 346—73)

(Granted under the act of March 3, 1883, as amended April 30, 1928; 370 O. G. 757)

This invention relates to improvements in kinematic measuring devices, and more particularly pertains to improvements in velocity measuring and recording devices.

In developing and operating catapults for launching planes and other devices having a predetermined optimum linear or rotational velocity characterizing function of a component element, it is desirable to provide a simple, efficient and accurate device that will measure directly and record the velocity of the element against distance and time. This is accomplished in the subject device by means of a novel combination that converts the velocity of such element into centrifugal force. Such force, acting against a spring, displaces an associated indicator, and a suitable scribe coupled to that indicator plots that force against distance while a record of elapsed time is plotted simultaneously. The velocity of the mechanism is recorded by the device for every point of its travel, so that accelerations can be determined facilely by measuring the slope of the velocity curve produced.

The primary object of the invention is to provide a device adapted to measure directly and to record the linear or rotational velocity of a machine element.

Another object is to provide a device adapted to convert the linear or rotational velocity of a device into centrifugal force and to provide means to plot a record of that force against distance and time.

Other objects and many of the attendant advantages of this invention will be readily appreciated as the same becomes better understood by reference to the following detailed description when considered in connection with the accompanying drawing wherein.

Similar numerals refer to similar parts throughout the several views.

Figure 1:
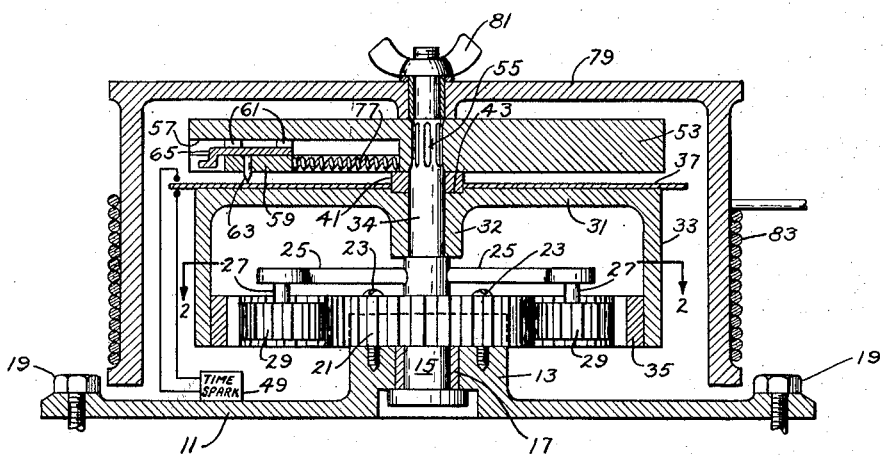
Fig. 1 is a vertical section of a velocity measuring and recording device, showing a preferred embodiment of the invention.

Base plate 11 is provided with a central boss 13. Shaft 15 is carried rotatably in bearing 17 in said boss. A plurality of bolts 19 proximate the periphery of said base plate are adapted to secure said base plate to a suitable standard.

Stationary sun gear 21 is carried on shaft 15 and is seated on boss 13, said gear 21 being secured to said boss by screws 23. Spiders 25 are secured to shaft 15, extending normal to the axis of said shaft, and carry stub shafts 27. Planetary or spider gears 29 are mounted rotatably on said shafts 27, in mesh with sun gear 21.

Table 31 is mounted rotatably on shaft 15, the hub 32 of said table being seated on the shoulder formed by the reduced portion 34 of said shaft and the lower portion of said shaft. Said table 31 is provided with an integral depending rim 33. Bull or rim gear 35 is secured to the inner nether portion of rim 33, said rim gear 35 meshing with planetary gears 29 so that gears 21, 29 and 35 provide an epicyclic gear train coupling the shaft 15 and the table 31.

Calibrated card 37 is a disc having a central non-circular slot 39 so that spacer 41 can be mounted rotatably on shaft 15 and can depend through slot 39 into a recess 43 in table 31 and thereby prevent rotation of card 37 relative table 31. Said card 37 is marked with radial lines 45 denoting a scale of degrees (see Fig. 3) and is marked with a plurality of circles 47 concentric the axis of rotation of the card, said circles 47 being calibrated in units of velocity according to the design characteristics—the significant gear ratios—of the device.

Figure 3:
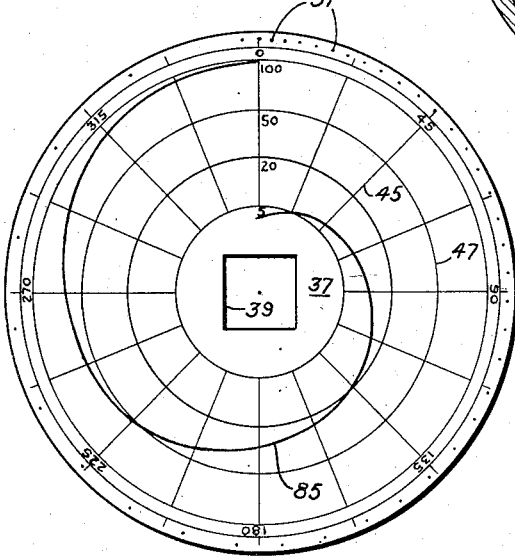
Fig. 3 is a plan view of a plot card showing a velocity curve and time intervals recorded thereon.

A conventional time spark device 49 discharges at uniform intervals of time across the card 37, so that a spark impression 51 is made upon said card. Preferably, such impression is made proximate the rim of the card, as shown in Figs. 1 and 3, said rim extending beyond the periphery of the table 31.

Disc 53 is secured on the fluted portion 55 of shaft 15, said disc thus being seated on and rotatable relative spacer 41. A radial T-slot 57 cut in the nether face of said disc carries the scriber assembly hereinafter described.

Figure 4:
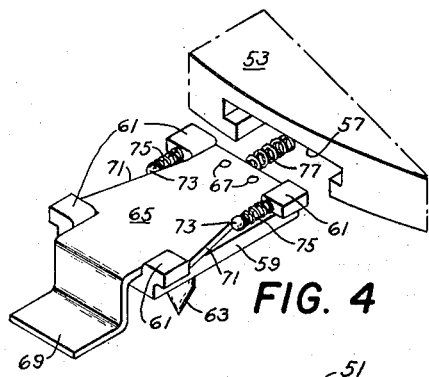
Fig. 4 is an exploded isometric view of the scriber-carrying mass and associated elements.
Figure 2:
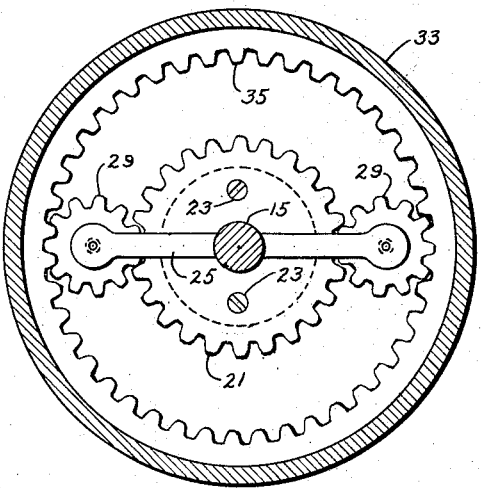
Fig. 2 is a section taken on the line 2—2 of Fig. 1.

The scriber assembly includes a rectangular plate 59 having ears 61 extending from the corners of said plate, so that said plate and said ears define a T-shape engageable slidably in T-slot 57. Scriber 63 is mounted on and depends from the nether face of said plate 59. Leaf spring 65 is secured to the upper face of plate 59, between ears 61, by means of rivets 67, said leaf spring having a tongue portion 69 extending beyond said plate for use in the manner hereinafter described. Opposite longitudinal edges 71 of said leaf spring taper inwardly, as shown in Fig. 4, so that balls 73 bear against the channel walls of the T-slot 57 under the force of springs 75, which are secured to the ears 61 at the inner and narrower end of said leaf spring, when the scriber assembly is at rest. Expansion spring 77 couples the inner end of the scriber assembly and the inner end of said T-slot 57.

Drum reel 79 is secured removably on shaft 15 by wing nut 81, the wall of said drum reel encompassing and housing the elements above described. Cable 83 is wound upon said drum reel.

In operation card 37 is seated on table 31, said card being secured against rotation relative said table by spacer 41. Disc 53 is then secured on the fluted portion of shaft 15. Being at rest, the scriber assembly is held by spring 77 near the inner end of T-slot 57. Drum reel 79 is then secured on shaft 15 by wingnut 81, and the cable 83 wound on said drum reel is then secured to the device to be tested.

When cable 83 is pulled by the device to be tested, time-sparking device 49 is actuated by suitable trip mechanism (not shown) and the rotation of the drum reel by the cable is transmitted through the shaft 15 and the epicyclic gear train to the table 31. As the speed of rotation of disc 53, which is coupled by shaft 15 to said drum reel, increases, the scriber assembly moves radially in T-slot 57, the centrifugal force of rotation of the scriber assembly mass overcoming the retarding force of spring 77. With such movement, plot line 85 is marked upon card 37. When the device has reached peak acceleration, restoration of the scriber assembly mass to its rest position is prevented by balls 73 and springs 75, said balls bearing against the channel walls of the T-slot under the force of said springs and the tapered edges of leaf spring 65. By depressing tongue portion 69, the scriber assembly can be returned to its original position.

It is thus apparent that all of the intelligence required is plotted on card 37. The radial distance of a point on plot line 85 from the rest position indicates velocity, while the time spark 51 at the radius including that point indicates the period of time required to attain that velocity. By suitable calibration of the radii 45 and circles 47, as shown in Fig. 3, velocity can be read directly and time can be determined facilely.

Distance of travel is measured facilely by determination of the number of degrees of indicator card rotation, each degree of such rotation representing the same distance of travel. That is, if 10° rotation represents 5 feet of travel, 20° rotation represents 10 feet and 30° rotation indicates 15 feet of travel. Velocity at any distance from the start of travel can therefore be determined readily.

Obviously many modifications and variations of the present invention are possible in the light of the above teachings. It is therefore to be understood that within the scope of the appended claims the invention may be practiced otherwise than as specifically described.

The invention described herein may be manufactured and used by or for the Government of the United States of America for governmental purposes without the payment of any royalties thereon or therefor.

I claim:

1. Velocity-recording mechanism comprising a base member, a shaft carried rotatably in a bearing in said member, a drum reel secured to said shaft, a disc carried by said shaft, a mass carried by and slidable radially relative said disc, means to constrain radial movement of said mass, recording means on said mass, a table mounted rotatably on said shaft and adapted to carry a calibrated card to be scored by said recording means, and a speed-reducing linkage coupling said shaft and said table.

2. Velocity-recording mechanism comprising a base member, a shaft carried rotatably in a bearing in said member, a drum reel secured to said shaft, a disc carried by said shaft, a mass carried by and slidable radially relative said disc, means to constrain radial movement of said mass, recording means on said mass, a table mounted rotatably on said shaft and adapted to carry a calibrated card to be scored by said recording means, a speed-reducing linkage coupling said shaft and said table, and means to record time intervals on said card.

3. Velocity-recording mechanism comprising a base member, a shaft carried rotatably in a bearing in said member, a drum reel secured to said shaft, a disc carried by said shaft, a mass carried by and slidable radially relative said disc, means to constrain radial movement of said mass, releasable means to prevent reciprocal movement of said mass, recording means on said mass, a table mounted rotatably on said shaft and adapted to carry a calibrated card to be scored by said recording means, and a speed-reducing linkage coupling said shaft and said table.

4. Velocity-recording mechanism comprising a base member, a shaft carried rotatably in a bearing in said member, a drum reel secured to said shaft, a disc carried by said shaft, a mass carried by and slidable radially relative said disc, means to constrain radial movement of said mass, releasable means to prevent reciprocal movement of said mass, recording means on said mass, a table mounted rotatably on said shaft and adapted to carry a calibrated card to be scored by said recording means, a speed-reducing linkage coupling said shaft and said table, and means to record time intervals on said card.

5. Velocity-recording mechanism comprising a base plate, a shaft carried rotatably in bearings in said plate, a drum reel secured removably to said shaft, a disc having a radial T-slot carried by said shaft interior said drum reel, a mass carried slidably in said slot, spring means to constrain radial movement of said mass, recording means on said mass depending from said slot, a table mounted rotatably on said shaft below said disc and carrying a calibrated card adapted to be scored by said recording means, and an epicyclic gear train coupling said shaft and said table.

6. Velocity-recording mechanism comprising a base plate, a shaft carried rotatably in bearings in said plate, a drum reel secured removably to said shaft, a disc having a radial T-slot carried by said shaft interior said drum reel, a mass carried slidably in said slot, spring means to constrain radial movement of said mass, recording means on said mass depending from said slot, a table mounted rotatably on said shaft below said disc and carrying a calibrated card adapted to be scored by said recording means, an epicyclic gear train coupling said shaft and said table, and means to record time intervals on said card.

7. Velocity-recording mechanism comprising a base plate, a shaft carried rotatably in bearings in said plate, a drum reel secured removably to said shaft, a disc having a radial T-slot carried by said shaft interior said drum reel, a mass carried slidably in said slot, spring means to constrain radial movement of said mass, releasable means to prevent reciprocal movement of said mass, recording means depending from said slot, a table mounted rotatably on said shaft below said disc and carrying a calibrated card adapted to be scored by said recording means, and an epicyclic gear train coupling said shaft and said table.

8. Velocity-recording mechanism comprising a base plate, a shaft carried rotatably in bearings in said plate, a drum reel secured removably to said shaft, a disc having a radial T-slot carried by said shaft interior said drum reel, a mass carried slidably in said slot, spring means to constrain radial movement of said mass, releasable means to prevent reciprocal movement of said mass, recording means depending from said slot, a table mounted rotatably on said shaft below said disc and carrying a calibrated card adapted to be scored by said recording means, an epicyclic gear train coupling said shaft and said table, and means to record time intervals on said card.

9. Velocity-recording mechanism comprising a base member, a shaft carried rotatably in a bearing in said member, a drum reel secured to said shaft, a cable wound on said drum reel, a disc carried by said shaft, a mass carried by and slidable radially relative said disc, means to constrain radial movement of said mass, recording means on said mass, a table mounted rotatably on said shaft and adapted to carry a calibrated card to be scored by said recording means, and a speed-reducing linkage coupling said shaft and said table.

10. In velocity-recording mechanism having an element including a radial slot, a scriber assembly comprising a plate, means to carry said plate slidably in such slot, means to constrain radially outward movement of said assembly in such slot, a leaf spring secured to a face of said plate, said leaf spring having opposite edges tapered inwardly in the direction of said constraining means, balls each adapted to bear against said plate, said tapered edges and the walls of such slot, and means on said plate to urge said balls toward such bearing relation.

11. In velocity-recording mechanism having an element including a radial slot, a scriber assembly comprising a plate, means to carry said plate slidably in such slot, means to constrain radially outward movement of said assembly in such slot, a leaf spring secured to a face of said plate, said leaf spring having opposite edges tapered inwardly in the direction of said constraining means, balls each adapted to bear against said plate, said tapered edges and the walls of such slot, and springs secured to said plate and adapted to urge said balls toward such bearing relation.

12. Velocity-recording mechanism comprising a base member, a shaft carried rotatably in a bearing in said member, a drum reel secured to said shaft, a disc carried by said shaft, a mass carried by and slidable radially relative said disc, recording means on said mass, and a table rotated by said shaft and adapted to carry a calibrated card to be scored by said recording means.

13. Velocity-recording mechanism comprising a base member, a shaft carried rotatably in a bearing in said member, a drum reel secured to said shaft, a disc carried by said shaft, a mass carried by and slidable radially relative said disc, means to constrain radial movement of said mass, recording means on said mass, and a table rotated by said shaft and adapted to carry a calibrated card to be scored by said recording means.

JOSEPH BROWN.

REFERENCES CITED

The following references are of record in the file of this patent:

UNITED STATES PATENTS

| Number | Name | Date |
| --- | --- | --- |
| 1,925,325 | Keller | Sept. 5, 1933 |
| 1,980,786 | Cool | Nov. 13, 1934 |
| 2,409,537 | Bright | Oct. 15, 1946 |